United States Patent [19]
Lang et al.

[11] Patent Number: 5,325,224
[45] Date of Patent: Jun. 28, 1994

[54] TIME-MULTIPLEXED, OPTICALLY-ADDRESSED, GIGABIT OPTICAL CROSSBAR SWITCH

[75] Inventors: Robert J. Lang, Pleasanton; Li-Jen Cheng, La Cresenta; Joseph Maserjian, Valencia, all of Calif.

[73] Assignee: California Institute of Technology, Pasadena, Calif.

[21] Appl. No.: 28,243

[22] Filed: Mar. 9, 1993

[51] Int. Cl.$^5$ .............................................. H04J 14/08
[52] U.S. Cl. ................... 359/139; 359/117; 385/17
[58] Field of Search ............ 359/139, 178, 117, 109, 359/123; 385/17, 16

[56] References Cited

U.S. PATENT DOCUMENTS

| | | | |
|---|---|---|---|
| 4,013,000 | 2/1977 | Kogelnik | 385/17 |
| 5,040,864 | 8/1991 | Hong | 385/16 |
| 5,227,906 | 7/1993 | Tokumitsu | 359/139 |
| 5,255,332 | 10/1993 | Welch et al. | 385/17 |

FOREIGN PATENT DOCUMENTS

2243967 11/1991 United Kingdom ............. 359/117

OTHER PUBLICATIONS

A. G. Larsson et al, "Molecular beam epitaxy engineered III–V semi-conductor structures for low-ower optically addressed spatial light modulators", in *Optical Engineering*, vol. 31 No. 7, pp. 1576–1582 (Jul. 1992).

*Primary Examiner*—Richard E. Chilcot, Jr.
*Assistant Examiner*—Kinfe-Michael Negash
*Attorney, Agent, or Firm*—Benman Collins & Sawyer

[57] ABSTRACT

A time-multiplexed, optically-addressed, crossbar switch (38) is provided using a two-dimensional, optically-addressed, reflective spatial light modulator (O-SLM) (20). Since the optical addressing is time-multiplexed, only N addressing lines are required for an $N \times N$ crossbar, rather than the $N^2$ lines needed in the prior art. This reduction in addressing lines makes possible the development of enormous crossbar switches, such as $100 \times 100$, for the first time. In addition, since data paths remain entirely in the optics domain, data speeds can reach the multi-gigabit level. In the switch, a row (40) of N inputs (42) at the "read" wavelength is spread over one axis of the O-SLM. The light is refocused along the other axis to an output array (48) of detectors (50), so that each input has the potential to talk to any one output. The O-SLM is normally off, i.e., non-reflective, so that the output is, in the absence of an input signal, zero. A one-dimensional array (52) of lasers (54) at the "write" wavelength is imaged onto the O-SLM. Each laser scans across an entire row of the O-SLM; where the laser is on, it turns on a portion of the O-SLM and establishes a connection between a particular input and a particular output. A full row is scanned in a time much shorter than the response time of the O-SLM, so that state of the O-SLM is capacitively stored and dynamically refreshed. The scanning is accomplished by tuning the wavelength of the laser and passing it through a grating, which sweeps the beam in space.

12 Claims, 4 Drawing Sheets

TIME-MULTIPLEXED, OPTICALLY-ADDRESSED, GIGABIT OPTICAL CROSSBAR SWITCH

ORIGIN OF THE INVENTION

The invention described herein was made in the performance of work under a NASA contract, and is subject to the provisions of Public Law 96-517 (35 USC 202) in which the Contractor has elected to retain title.

TECHNICAL FIELD

The invention relates to crossbar switches, and, more particularly, to optically-addressable crossbar switches.

BACKGROUND ART

A crossbar switch is a fundamental unit of many communications networks, ranging from telecommunications to computer interconnects. In the most general form of a crossbar switch, each of N inputs may be connected to any number of N outputs. In the most common implementation, the input-output connection is one-to-one, that is, one input goes to exactly one output.

Electronic implementations of a crossbar switch can be quite simple and monolithic at low data rates. In the typical configuration of an electronic crossbar switch, N inputs are directed into a matrix of $N^2$ switches that connect the inputs to the N outputs. While each of the $N^2$ switches requires its own control line, in practice each switch would be equipped with a memory element so that they need not be programmed simultaneously. In practice, the switches are programmed through some type of multiplexed addressing scheme.

The limitations of electronic crossbar switches become significant as data rates climb into the gigabit regime, bringing with it problems of crosstalk, propagation delay, and waveform dispersion. Furthermore, these prior art switches grow enormously in physical size and power considerations as data rates increase.

It is precisely in the gigabit regime where optical data paths begin to show superior performance. An optical implementation of the same crossbar switch is in principle possible. Techniques for optical generation, modulation, and detection are now well-developed. What has been missing up to now is the matrix switch array incorporating high density, good contrast, and built-in memory.

Thus, improved crossbar switches are required to handle data rates in the gigabit regime.

DISCLOSURE OF INVENTION

In accordance with the invention, a solution to the above problems is offered by a time-multiplexed, optically-addressed, gigabit optical crossbar switch in which a row of N inputs at the "read" wavelength is spread over one axis of a two-dimensional optically-addressed reflective spatial light modulator (O-SLM) array. The light is refocused along the other axis to an output array of detectors, so that each input has the potential to talk to any one output.

The switch's O-SLM is normally off, or non-reflective, so that the output is zero, in the absence of an input signal. A one-dimensional array of lasers at the "write" wavelength is imaged onto the O-SLM. Each laser scans across an entire row of the O-SLM; where the laser is on, it turns on a portion of the O-SLM and establishes a connection between a particular input and a particular output. A full row is scanned in a time much shorter than the response time of the O-SLM, so that the state of the O-SLM is capacitively stored and dynamically refreshed. The scanning is accomplished by tuning the wavelength of the laser and passing it through a grating, which sweeps the beam in space.

The crossbar switch of the invention comprises:

(a) the two-dimensional, optically-addressable, reflective, pixellated spatial light modulator comprising $N \times N$ pixel elements, where N is an integer;

(b) a one-dimensional source array comprising N sources adapted to receive electrical signal input and provide a one-dimensional optical input corresponding thereto, the n-channel source array operating at a first wavelength (read wavelength) and defining a first axis;

(c) means for scanning the one-dimensional optical input over an axis of the spatial light modulator orthogonal to that of the one-dimensional source array;

(d) a one-dimensional output array of detectors, adapted to receive one-dimensional optical output from the spatial light modulator and provide an output electrical signal corresponding thereto, the one-dimensional output array operating at the first wavelength;

(e) means for refocusing optical output reflected from the spatial light modulator onto the one-dimensional output array;

(f) a one-dimensional array of tunable lasers operating within a range of second wavelengths (write wavelengths), each laser operating at a separate wavelength and imaged onto the spatial light modulator, the one-dimensional array orthogonal to the first axis defined by the one-dimensional source array, the range of second wavelengths capable of making portions of the spatial light modulator reflective; and (g) means for scanning each laser in the one-dimensional array of tunable write lasers across the spatial light modulator and orthogonal to the one-dimensional source array so as to make portions of the spatial light modulator reflective and establish a connection between a particular optical input from the source array and a particular optical output to the detector array.

The switch of the present invention can be made extremely small, and the data rate is limited only by the modulation speed of the laser source array. The current state-of-the-art is 10 Gbit/channel.

BEST MODES FOR CARRYING OUT THE INVENTION

Figure 1:
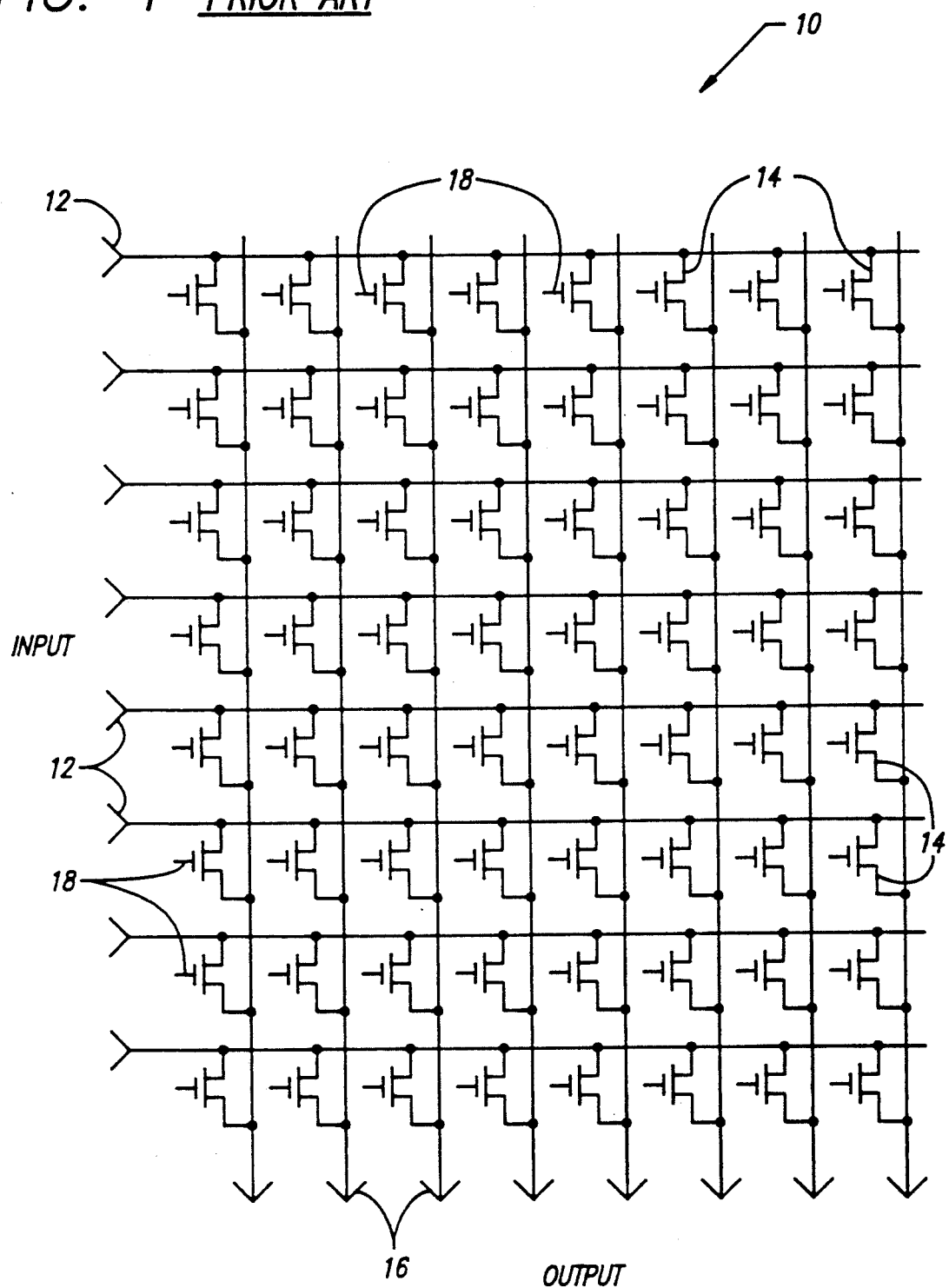
FIG. 1 is a schematic diagram of a prior art electrical crossbar switch.

A schematic prior art crossbar switch 10 is illustrated in FIG. 1. N inputs 12 are directed into a matrix of $N^2$ switches 14 that connect the inputs to the N outputs 16. While each of the $N^2$ switches 4 requires its own control line 18, in practice each switch would be equipped with a memory element (not shown) so that they need not be programmed simultaneously. In practice, the switches are programmed through some type of multiplexed addressing scheme, as is well-known.

Figure 2:
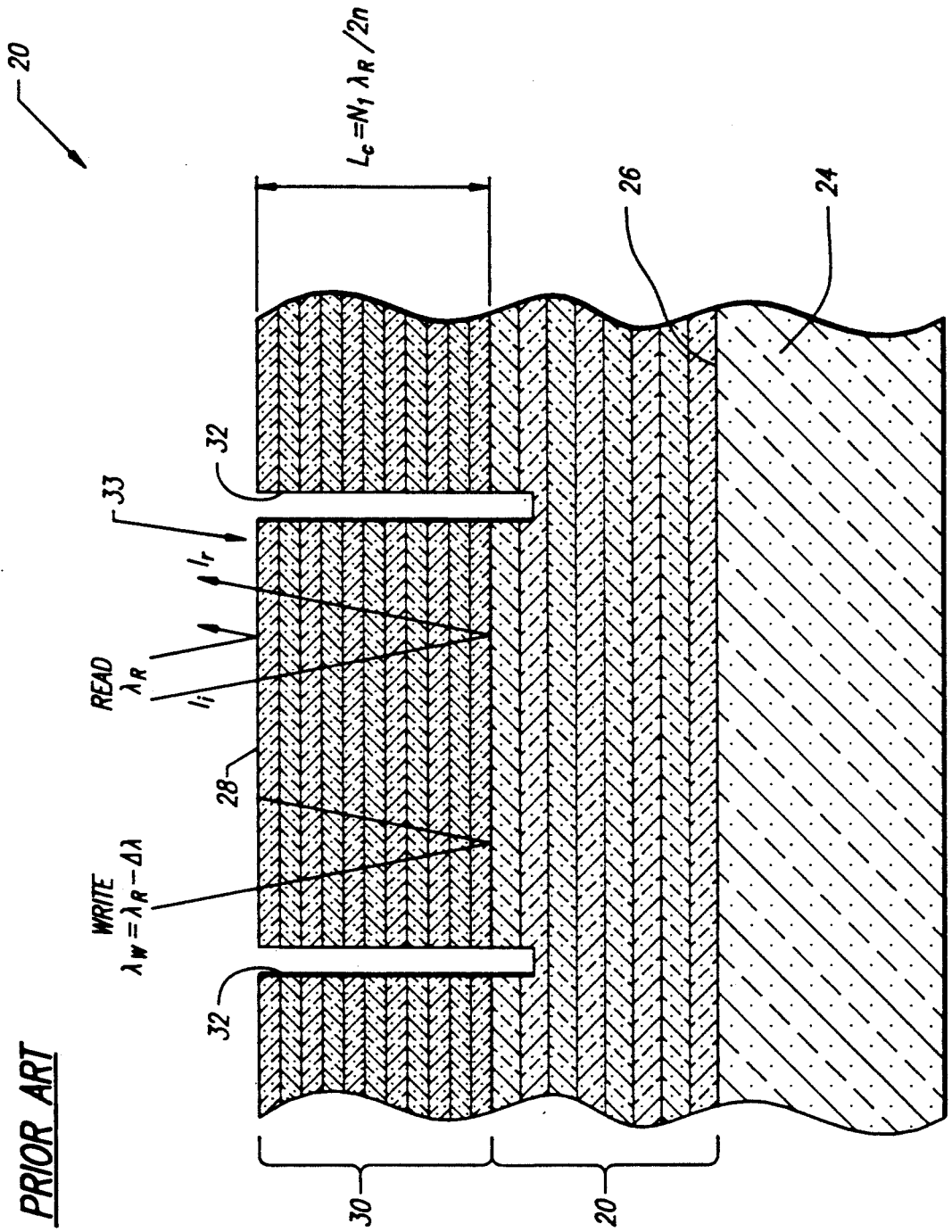
FIG. 2 is a cross section of an asymmetric Fabry-Perot optical spatial light modulator, showing one pixel in an array, employed in the practice of the invention.
Figure 3:
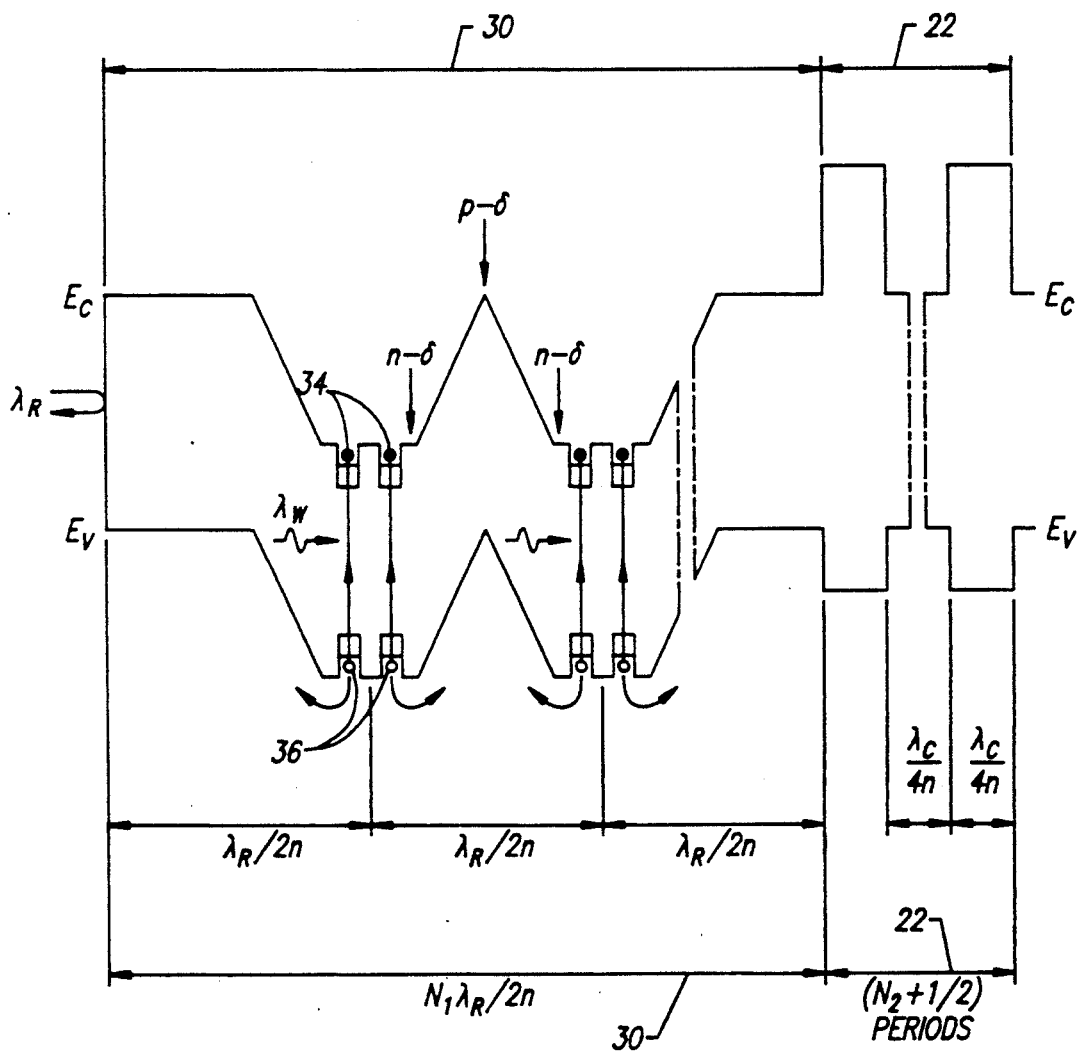
FIG. 3 is a band diagram of the complete cavity structure of the Optically addressed modulator structure shown in FIG. 2.

A high-contrast optical spatial light modulator (O-SLM) with many of the properties required for an optical crossbar switch has been developed by the Jet Propulsion Laboratory (Pasadena, Calif.), and is shown in FIGS. 2 and 3. The O-SLM has been disclosed by A.G. Larsson et al in *Optical Engineering*, Vol. 31, No. 7, pp. 1576–1582 (Jul. 1992).

The O-SLM employed in the practice of the invention comprises an asymmetric Fabry-Perot O-SLM device structure which permits extinction of light due to interference of light reflected from the front and back surfaces of the cavity. Optically controlled modulation of the absorption in the active cavity layers unbalances the cavity and "turns on" the reflected output signal, thereby allowing large contrast ratio. This approach is realized with an all-MBE (molecular beam epitaxy)-grown structure consisting of GaAs/AlAs quarter-wave stack grown over a GaAs substrate as the high reflectance mirror ($\approx 0.98$) and the GaAs surface as the low reflectance mirror ($\approx 0.3$). The active cavity employs (In,Ga)As/GaAs multiple quantum wells separated by periodically $\delta$-doped GaAs barriers to achieve a sensitive photo-optic effect due to exciton quenching. High-contrast modulation ($>60:1$) is achieved using a low-power ($<100$ mW/-cm$^2$) (In,Ga)As/GaAs quantum well laser for the control signal.

A cross-sectional view of the asymmetric Fabry-Perot O-SLM device structure 20 is shown in FIG. 2 and its energy band diagram in FIG. 3, where $\lambda_W$, $\lambda_R$, and $\lambda_C$ are the read, write, and the distributed Bragg reflector (DBR) center wavelengths, respectively. The variable $\Delta\lambda$ indicates the difference between the write and read wavelengths. The O-SLM structure 20 is grown by MBE, with a DBR 22 consisting of $N_2 + \frac{1}{2}$ periods ($N_2$ is an integer) of a quarter-wave stack of GaAs/AlAs layers grown over a GaAs substrate 24 as the high-reflectivity bottom mirror $R_2$ ($\approx 98\%$ for $N_2 = 14$) 26 and the GaAs surface as the low-reflectivity top mirror ($R_1, \approx 30\%$) 28. The active cavity structure 30 may use certain photo-optic effects such as exciton quenching, as further discussed in the above-referenced Larsson et al paper. Using exciton quenching, modulation of the read signal reflectivity is accomplished with the read wavelength $\lambda_R$ equal to the excitonic resonance of the quantum wells and with a cavity thickness $L_c$ equal to an integer number $N_1$ of dielectric half-wavelengths of the read signal (i.e., $N_1 \cdot \lambda_R/-2n$, where n is the refractive index), so that the cavity mode used for the modulation occurs at $\lambda_R$. To achieve maximum absorption and coupling of the read signal, a pair of quantum wells (instead of one) are placed at the periodic conduction band minima and positioned with period $\lambda_R/2n$ to coincide with the antinodes of the electromagnetic field in the cavity. For spatial resolution, the structure is pixellated with etched grooves 32 to appropriate dimensions (e.g., 2 to 50 $\mu$m) to provide pixels 33. This pixellation process does not degrade the device by surface recombination, because the separated electrons and holes are majority carriers in their respective n$^+$ and p$^+$ layers, which are depleted at the surfaces by surface state pinning.

In the energy band diagram shown in FIG. 3, the generation of electron-hole pairs by the write signal and the subsequent spatial separation of electrons 34 and holes 36 is shown. The positions of the Si- and Be-doping planes are indicated by n$-\delta$ and p$-\delta$, respectively.

In the O-SLM 20, a high contrast (60:1) is achieved by using a balanced low-Q interferometric design for the resonator. The low-Q cavity has the additional advantage of a relatively wide bandwidth for the read wavelength, which relaxes the tight constraints on uniformity found in high-Q modulators. Modulation of the optical properties is achieved by combining the quantum wells with a delta-doped nipi structure that enforces charge separation. This structure gives moderately long carrier lifetimes, yielding simultaneously high sensitivity and a built-in memory. The former allows addressing with low-power diode lasers; the latter allows a time-multiplexed addressing scheme. This O-SLM permits the implementation of a high-speed optical crossbar switch.

SYSTEM DESCRIPTION

Figure 4:
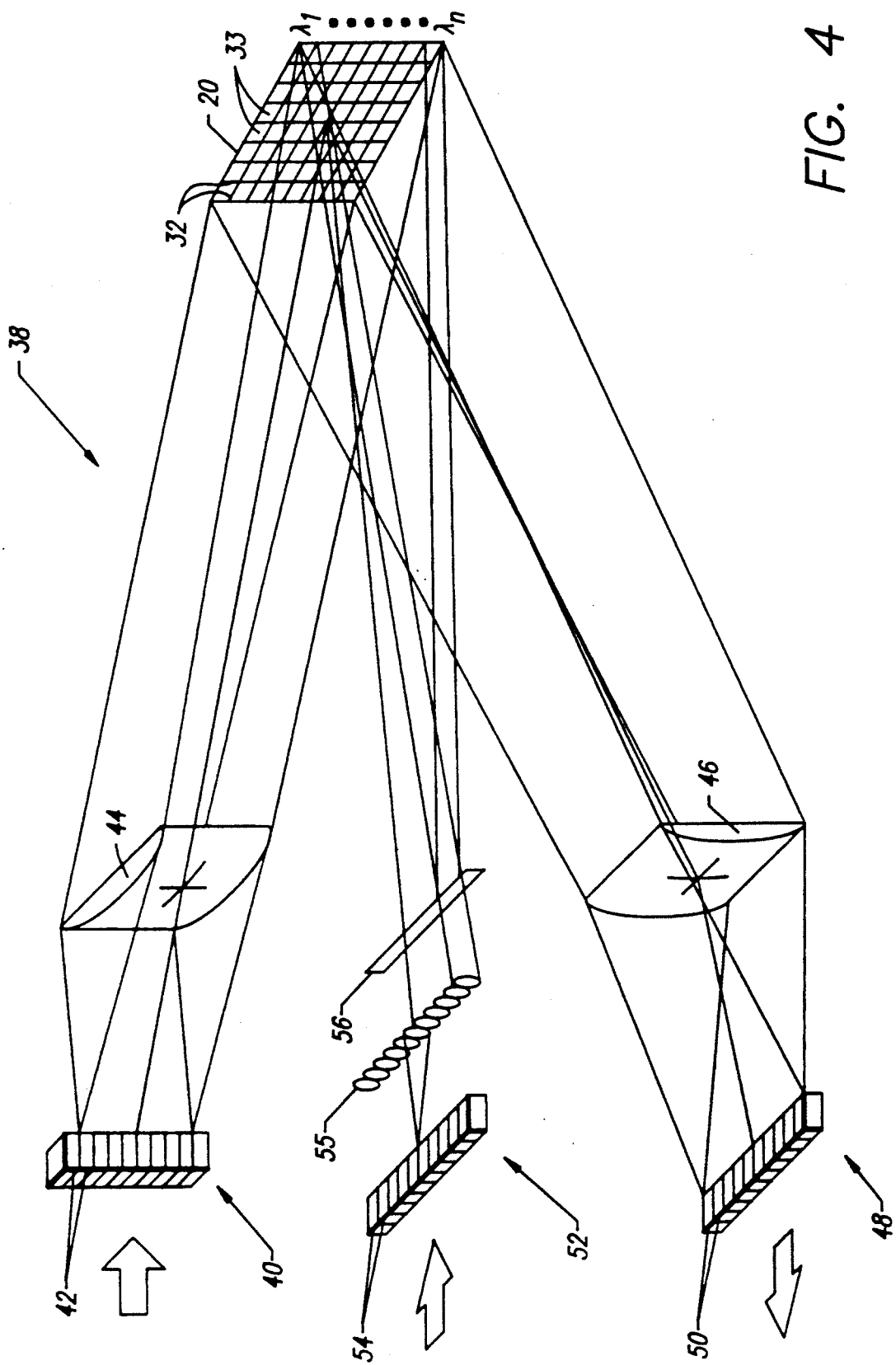
FIG. 4 is a time-multiplexed, optically-addressed, gigabit optical crossbar switch in accordance with the invention.

The crossbar switch 38 of the invention is illustrated in FIG. 4. A row 40 of N inputs 42 at the "read" wavelength (1015 nm) is spread by cylindrical lens 44 over one axis of a two-dimensional optically-addressed reflective spatial light modulator array 20. The light is refocused by cylindrical lens 46 along the other axis to an output array 48 of detectors 50, so that each input has the potential to talk to any one output. Spreading of light by lens 44 over the SLM 20 is orthogonal to the input array 42. Thus, considering FIG. 4, if the input array 42 is considered to be a "row" of inputs, then the light is spread orthogonal thereto, or along the "columns" of the SLM 20.

The O-SLM 20 is normally off, i.e., non-reflective, so that the output is, in the absence of an input signal, zero. A one-dimensional array 52 of lasers 54 at the "write" wavelength (900 to 950 nm) is imaged onto the O-SLM. The one-dimensional array 52 is orthogonal to the input, or source, array 42. Each laser 54 scans across an entire "column" of the O-SLM 20; where the laser is on, it turns on a portion of the O-SLM, making that portion reflective, and thereby establishes a connection between a particular optical input from the source array 42 and a particular optical output to the detector array 48. A full column is scanned in a time much shorter than the response time of the O-SLM 20 (1 ms to 10 $\mu$s, depending on the light level). Therefore, while the state of the O-SLM 20 is set in the first scan, it is refreshed before the charge decays, much like an electronic DRAM. The scanning is accomplished by tuning the wavelength of the laser 54 and passing it through a collimating lens 55 and thence through a diffraction grating 56, which sweeps the beam in space.

SYSTEM COMPONENTS: CAPABILITIES AND REQUIREMENTS

A. O-SLM

The optically-addressed spatial light modulator (O-SLM) 20 is the key to the system of the invention. In an exemplary embodiment, the O-SLM 20 exhibits a contrast of about 60:1 over several mm$^2$ with low ($=30$ mW) illumination levels. The effect of the contrast ratio at the system level lies in the crosstalk. If $\epsilon$ is the inverse contrast (i.e., 1/60) and there are N inputs, then the spurious light level at any given output will be $(N-1)\epsilon$, that is, the sum of all of the crosstalk from each channel. For an 8$\times$8 switch and 60:1 contrast, the spurious signal level will be approximately 13% of the true signal level, which may be removed by thresholding the output signal. However, it is not unreasonable to expect that higher contrast ratios will be available as the SLM's cavity structure and nipi structure are optimized.

Another requirement on the O-SLM 20 is reasonable uniformity over an area sufficient to achieve a usable number of pixels. The current O-SLM structure gives usable areas of typical 3×3 mm² and is subject to improvement. The minimum pixel size, determined by the diffraction limit is about 2×2 μm² giving a maximum size of the array of 1500×1500 pixels 33. Clearly, usable area will not be a limiting factor in the near future. (This is in marked contrast to high-Q resonator SLMs, in which the usable area may itself be a diffraction-limited spot.) In fact, a single O-SLM may be used to implement many crossbar switches in parallel. Thus, while FIG. 4 illustrates a single-bit 8×8 crossbar switch, with the addition of more sources and detectors for data paths and some modifications to the optics, the same O-SLM could be used to realize a 32-bit deep 8×8 crossbar switch. Note that no additional "write" lasers would be required in this scenario.

The O-SLM 20 must be pixellated to prevent lateral crosstalk between pixels 33 of the O-SLM. Pixellation of the current O-SLM 20, described above employing grooves 32, can most likely be achieved by reactive ion etching or possibly by a simple ion implantation.

The high sensitivity and internal memory of the O-SLM 20 are based on the relatively long carrier lifetime within the array, which ranges from a few ms to ≈10 μs, depending on the incident light level. The lifetime/sensitivity tradeoff is a fundamental limit of the device physics, and this lifetime ultimately limits the reconfiguration time of the crossbar to this same time constant. However, it must be noted that this time constant in no way limits the data rate on the incident beam, which may be made almost arbitrarily high. The only limit on the input data rate imposed by the O-SLM 20 is that the input signal's spectrum must lie within the modulation bandwidth of the O-SLM. This bandwidth is 2 to 3 nm, which gives a data bandwidth limit of a few teraHertz. Clearly, this will not be a significant limitation.

The O-SLM 20 also sets the operating wavelength, as it is based on the use of strained (In,Ga)As quantum wells 30 and GaAs/AlAs multilayer reflectors 22. The read wavelength must be at around 1015 nm, while the write wavelength must be below that of the band edge, about 900 to 950 nm. Fortunately, these wavelengths are well within the demonstrated capabilities of current laser diode technology.

B. Data (Read) Laser Array

The input laser array 40 must be at the read wavelength, typically 1015 nm to within 1 to 2 nm. This is not a standard wavelength for commercial laser diodes, but has been demonstrated in several laboratories. The input lasers 42 must also be capable of being modulated at the input data rates. High-speed GaAs-based lasers have been demonstrated with modulations rates in excess of 20 GHz. This is therefore a reasonable estimate for the near term as the upper limit on data rate through the crossbar. However, as the technology of high-speed laser modulation improves, the optical crossbar 38 could be upgraded merely by replacing the input laser array 40 (and possibly the detector array 48; however, fast detectors are more readily available than fast lasers, which implies that lasers will be the limiting factor).

Ideally, a monolithic laser array 40 would be desired for the input (as illustrated in FIG. 4). Monolithic integration of multiple diode lasers is currently being pursued; however, there are considerations of thermal management and crosstalk that may limit such implementation. This not necessarily a limiting factor, however, because the monolithic array could be replaced by a discrete array of lasers fiber-coupled to the one-dimensional input array. In either case, drive circuitry and thermal control circuitry will be required to convert the presumably electronic input to optical input and to maintain wavelength stability.

In addition, if the optical crossbar 38 of the invention is used within a wide-area optical network that is presumably operating at 1.3 or 1.55 μm wavelength for fiber optics, then wavelength conversion will be required. One method for achieving this would be direct detection followed by driving the short-wave laser diode. A better, but longer range, approach would be to develop the matched O-SLM and lasers for this wavelength using higher In content InGaAs or related materials which are already being developed or in use for fiber optics.

C. Write and Read Laser Arrays

The "write" laser array 52 must operate at higher bandgap energies than the "read" array 42, or 900 to 950 nm or so. The O-SLM 20 employed in the practice of the invention has a broad absorption response, making this not a severe constraint. While a single element 54 of the array 52 could be used to scan an entire "column" of the O-SLM 20 using an external deflector, e.g., an acousto-optic deflector, the wide absorption band of the O-SLM allows a particularly elegant method of sweeping the beam. A single-mode frequency-tunable laser 54 is employed and the beam is directed through the diffraction grating 56. The angle of the subsequent beam then depends upon the frequency of the laser. A typical laser that accomplishes this result would be a split-contact distributed feedback (DFB) laser. Such lasers can have tuning ranges of several nm, leading to easily $10^4$ resolvable spots while remaining within the absorption band of the O-SLM 20. For a single laser to be time multiplexed over an entire "column" of the O-SLM the frequency must be swept over its entire range many times within the few μs to few ms response time of the O-SLM. Such tunable DFB lasers can have modulation rates of 1 to 2 GHz, making this modulation easily possible.

Furthermore, a large class of optical crossbar interconnect applications require only one connection between any one input and any one output. In this case, the laser need not be swept in frequency at all; it is merely tuned to the proper frequency for the particular channel required.

An important system-level consideration in any tunable multi-wavelength system is the calibration of the frequency-tuning of each laser. This may be easily accomplished by injecting a probe signal at each input in turn, sweeping each "write" laser 52 over its entire range and recording the control levels when the probe beam hits each output.

The same considerations of monolithic integration apply to the read array 40 as to the write array 52. Even before monolithic tunable laser array are fabricated, fiber-pigtailed discrete devices may be used for system realization. Thermal control, amplitude and frequency control electronics will be required. It should be noted that for alignment purposes, multi-spatial mode fiber should be employed, as multiple alignments of single-mode fiber are extremely difficult.

D. Detector Array

High-speed individual detectors with response times in the tens of GHz are commercially available. While monolithically integrated high-speed detector arrays are not currently available, they are not anticipated to require further research, merely development. And, as with the laser array, fiber-pigtailed discrete devices may be used to realize the system in the absence of monolithic arrays.

E. Control Electronics

Control electronics, although not often displayed in schematic diagrams, are required for most optical (as well as electronic) crossbar switches. However, the types of control electronics required for the proposed system—signal conditioning/restoration for the data path and programming controls for the write arrays—are typical of conventional optoelectronics communications systems.

Limitations of the Proposed Technology

There is no practical upper limit on the data rate, as the switching is done entirely optically. Upper limits on the number of interconnects are limited by the contrast ratio of the O-SLM to around 10×10 interconnects with current technology and 100×100 estimated for the future as finer control over growth parameters permits higher contrast ratios.

The most significant limit at the present appears to be the reconfiguration time or switching speed, which is limited by the response time of the O-SLM to a minimum of around 10 $\mu$s. (A conventional HIPPI crossbar, by contrast, has a switching time of $\approx$100 ns.) This limits the application of the crossbar 38 to wide-area switching networks in which the travel time is comparable to the switching time.

In addition, with current O-SLM and laser technology, the data wavelength must be in the short-wave diode laser band ($\approx$1 m), rather than the commercial long-distance fiber-optic bands (1.3, 1.55 $\mu$m), which may necessitate the use of detection/retransmission wavelength conversion. However, future development in the longer wavelength materials as noted above will eliminate this limitation.

Performance Enhancement of the O-SLM

Improvements in the process control, i.e., the balance of the resonator, and process uniformity will allow an increase in the order of the crossbar switch. The major technological limitation lies in the relatively long carrier lifetime, which limits the switching speed.

Means of reducing the carrier lifetime by reducing somewhat the npn barriers between electrons and holes (see FIG. 3), increase the tunnelling rate. A shorter response time of under 1 $\mu$sec would make the time-division multiplexed addressing more difficult by increasing the required scanning speed, however, for 1-to-1 interconnection (as opposed to broadcast interconnection), no multiplexing is required. The other effect of a reduced response time would be a loss of sensitivity, requiring a higher write intensity. Current write intensities are at the level of $\approx$0.3W/cm$^2$; again, with the 1-to-1 interconnection and small pixels, there are 2 to 3 orders of magnitude by which this light level may be increased without seriously affecting the requirements on either the source (since the array is sparsely illuminated) or the O-SLM array.

Since the high-sensitivity O-SLM 20 may be switched on rapidly with an intense light pulse, an approach that does not degrade sensitivity would be to investigate alternative means of switching off the O-SLM rapidly, e.g., by "short-circuiting" the n and p layers of the nipi structure. This avenue is a strong candidate for further research. It should be pointed out that even with the existing structure, once pixellated, a crossbar switch may be realized with a data rate exceeding that which is commercially available electronically.

INDUSTRIAL APPLICABILITY

The small, gigabit-data-rate, low-power, optical crossbar switch of the invention is expected to find use in computer and network interconnects.

Thus, there has been disclosed a time-multiplexed, optically-addressed, gigabit optical crossbar switch. It will be appreciated by those skilled in this art that various changes and modifications of an obvious nature may be made without departing from the spirit of the invention, and all such changes and modifications are considered to fall within the scope of the invention, as defined by the appended claims.

What is claimed is:

1. A time-multiplexed, optically-addressed, gigabit optical crossbar switch comprising:
   (a) a two-dimensional, optically-addressable, reflective, pixellated spatial light modulator comprising NxN pixel elements, where N is an integer, said spatial light modulator normally non-reflective in the absence of an input signal;
   (b) a one-dimensional read source array comprising N sources, adapted to receive electrical signal input and provide a one-dimensional optical input corresponding thereto, said one-dimensional read source array operating at a first wavelength and defining a first axis;
   (c) means for scanning said one-dimensional optical input over an axis of said spatial light modulator orthogonal to that of said one-dimensional source array;
   (d) a one-dimensional output array of detectors, adapted to receive one-dimensional optical output from said spatial light modulator and provide an output electrical signal corresponding thereto, said one-dimensional output array operating at said first wavelength;
   (e) means for refocusing optical output reflected from said spatial light modulator onto said one-dimensional output array;
   (f) a one-dimensional array of tunable write lasers, said array of tunable write lasers operating within a range of second wavelengths, each laser operating at a separate wavelength and imaged onto said spatial light modulator, said one-dimensional array orthogonal to said first axis defined by said one-dimensional read source array, said range of second wavelengths capable of making portions of said spatial light modulator reflective; and
   (g) means for scanning each laser in said one-dimensional array of tunable write lasers across said spatial light modulator and orthogonal to said one-dimensional source array so as to make portions of said spatial light modulator reflective and thereby establish a connection between a particular optical input from said source array and a particular optical output to said detector array.

2. The time-multiplexed, optically-addressed, gigabit optical crossbar switch of claim 1 wherein said spatial light modulator exhibits a contrast ratio that varies with $N^2$.

3. The time-multiplexed, optically-addressed, gigabit optical crossbar switch of claim 2 wherein said spatial light modulator exhibits a contrast of at least about 60:1 for an array of 8×8 pixel elements.

4. The time-multiplexed, optically-addressed, gigabit optical crossbar switch of claim 1 wherein said first wavelength is at a longer wavelength than said second wavelength.

5. The time-multiplexed, optically-addressed, gigabit optical crossbar switch of claim 4 wherein said spatial light modulator includes a multiple quantum well structure comprising alternating layers of two different materials and wherein first and second wavelengths are related to the bandgaps of said two different materials.

6. The time-multiplexed, optically-addressed, gigabit optical crossbar switch of claim 5 wherein said one of said materials comprising said multiple quantum well structure comprises GaAs and wherein the other of said materials comprising said quantum well structure comprises (In,Ga)As.

7. The time-multiplexed, optically-addressed, gigabit optical crossbar switch of claim 6 wherein said first wavelength is at about 1015 nm and wherein said second wavelength ranges from about 900 to 950 nm.

8. The time-multiplexed, optically-addressed, gigabit optical crossbar switch of claim 1 wherein said one-dimensional source array comprises an array of diode lasers.

9. The time-multiplexed, optically-addressed, gigabit optical crossbar switch of claim 1 wherein said one-dimensional source array comprises an array of light emitting diodes.

10. The time-multiplexed, optically-addressed, gigabit optical crossbar switch of claim 1 wherein said means for scanning each laser comprises a diffraction grating.

11. The time-multiplexed, optically-addressed, gigabit optical crossbar switch of claim 1 wherein said means for scanning said one-dimensional output over one axis of said spatial light modulator comprises a cylindrical lens.

12. The time-multiplexed, optically-addressed, gigabit optical crossbar switch of claim 1 wherein said means for refocusing said optical output directed onto said spatial light modulator and reflected therefrom onto said one dimensional output array comprises a cylindrical lens.

* * * * *